United States Patent
Smith et al.

(10) Patent No.: US 8,385,052 B2
(45) Date of Patent: Feb. 26, 2013

(54) ELECTROCHEMICAL CAPACITOR CONTAINING RUTHENIUM OXIDE ELECTRODES

(75) Inventors: Jessica M. Smith, Myrtle Beach, SC (US); Lee Shinaberger, Surfside Beach, SC (US); Bob Knopsnyder, Myrtle Beach, SC (US); Gang Ning, Tempe, SC (US); Bharat Rawal, Surfside Beach, SC (US); Dirk Dreissig, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 706 days.

(21) Appl. No.: 12/331,818

(22) Filed: Dec. 10, 2008

(65) Prior Publication Data

US 2010/0142123 A1     Jun. 10, 2010

(51) Int. Cl.
  *H01G 9/00*   (2006.01)
(52) U.S. Cl. ............... 361/503; 361/321.4; 361/322; 361/321.1; 361/303; 361/321.5
(58) Field of Classification Search ............... 361/303, 361/313, 311, 321.2, 321.4, 321.5, 322, 321.1
See application file for complete search history.

(56) References Cited

U.S. PATENT DOCUMENTS

| | | |
|---|---|---|
| 4,992,910 A | 2/1991 | Evans |
| 5,003,428 A | 3/1991 | Shepherd |
| 5,098,485 A | 3/1992 | Evans |
| 5,155,658 A | 10/1992 | Inam et al. |
| 5,358,889 A | 10/1994 | Emesh et al. |

(Continued)

FOREIGN PATENT DOCUMENTS

| WO | WO 2005 077454 A2 | 8/2005 |
|---|---|---|
| WO | WO 2005 077454 A3 | 8/2005 |

(Continued)

OTHER PUBLICATIONS

Abstract of Article—*Formation of Dimpled Tantalum Surfaces from Electropolishing*, El-Sayed et al., J. Electrochem. Soc., vol. 154, Issue 12, pp. C728-C732 (2007).

(Continued)

*Primary Examiner* — Nguyen T Ha
*Assistant Examiner* — Hung Dang
(74) *Attorney, Agent, or Firm* — Dority & Manning, P.A.

(57) ABSTRACT

A capacitor containing an electrochemical cell that includes ruthenium oxide electrodes and an aqueous electrolyte containing a polyprotic acid (e.g., sulfuric acid) is provided. More specifically, the electrodes each contain a substrate that is coated with a metal oxide film formed from a combination of ruthenium oxide and inorganic oxide particles (e.g., alumina, silica, etc.). Without intending to be limited by theory, it is believed that the inorganic oxide particles may enhance proton transfer (e.g., proton generation) in the aqueous electrolyte to form hydrated inorganic oxide complexes (e.g., $[Al(H_2O)_6^{3+}]$ to $[Al_2(H_2O)_8(OH_2)]^{4+}$). The inorganic oxide thus acts as a catalyst to both absorb and reversibly cleave water into protons and molecular bonded hydroxyl bridges. Because the anions (e.g., sulfate and bisulfate ions) in the electrolyte are not bound in the coordination sphere of the formed aqua complexes, they do not impede the condensation of these complexes required to achieve the additional capacitance over the potential range. As a result, the ionic charges are kept separate and the chemical process may generate pseudo-capacitance. This, in turn, may result in an increase in the charge density and capacitance of the electrode.

17 Claims, 1 Drawing Sheet

U.S. PATENT DOCUMENTS

| | | | |
|---|---|---|---|
| 5,369,547 | A | 11/1994 | Evans |
| 5,400,211 | A | 3/1995 | Evans |
| 5,469,325 | A | 11/1995 | Evans |
| 5,600,535 | A | 2/1997 | Jow et al. |
| 5,737,181 | A | 4/1998 | Evans |
| 5,754,394 | A | 5/1998 | Evans et al. |
| 5,786,980 | A | 7/1998 | Evans |
| 5,851,506 | A | 12/1998 | Zheng et al. |
| 5,872,698 | A * | 2/1999 | Bai et al. .................. 361/503 |
| 5,875,092 | A | 2/1999 | Jow et al. |
| 5,963,417 | A | 10/1999 | Anderson et al. |
| 5,982,609 | A | 11/1999 | Evans |
| 6,025,020 | A | 2/2000 | Chen et al. |
| 6,094,339 | A | 7/2000 | Evans |
| 6,097,588 | A | 8/2000 | Zheng et al. |
| 6,133,159 | A | 10/2000 | Vaartstra et al. |
| 6,383,363 | B2 | 5/2002 | Jow et al. |
| 6,426,863 | B1 | 7/2002 | Munshi |
| 6,508,959 | B1 | 1/2003 | Li et al. |
| 6,514,296 | B1 | 2/2003 | Tsai et al. |
| 6,576,524 | B1 | 6/2003 | Evans et al. |
| 6,594,140 | B1 | 7/2003 | Evans et al. |
| 6,665,171 | B1 | 12/2003 | Takamuka et al. |
| 6,707,660 | B1 | 3/2004 | Evans et al. |
| 6,721,170 | B1 | 4/2004 | Evans et al. |
| 7,061,749 | B2 * | 6/2006 | Liu et al. .................. 361/502 |
| 7,084,002 | B2 | 8/2006 | Kim et al. |
| 7,541,312 | B2 * | 6/2009 | Dietz et al. .................. 502/432 |
| 2003/0068509 | A1 | 4/2003 | Shah et al. |
| 2003/0070920 | A1 | 4/2003 | Shah et al. |
| 2003/0107852 | A1 | 6/2003 | Chen |
| 2007/0271751 | A1 | 11/2007 | Weidman |
| 2008/0307620 | A1 | 12/2008 | Lee et al. |
| 2010/0002357 | A1 * | 1/2010 | Kim et al. .................. 361/305 |

FOREIGN PATENT DOCUMENTS

| | | |
|---|---|---|
| WO | WO 2009 117002 A1 | 9/2009 |
| WO | WO 2010 009469 A2 | 1/2010 |

OTHER PUBLICATIONS

Abstract of Article—*Ruthenium Oxide Thin Film Electrodes for Supercapacitors*, Kim, et al., Electrochem. Solid-State Lett., vol. 4, No. 5, pp. A62-A64, May 2001.

Abstract of Article—*Self-Assembled Porous Tantalum Oxide Prepared in $H_2SO_4/HF$ Electrolyte*, Sieber et al., Electrochemical and Solid-State Letters, vol. 8, Issue 3, pp. J-10-J-12 (2005).

Article—*Adsorption of Gases in Multimolecular Layers*, Brunauer et al., The Journal of the American Chemical Society, vol. 60, Jan.-Jun. 1938, pp. 309-319.

Article—*Electrochemical Capacitor Behavior of Layered Ruthenic Acid Hydrate*, Sugimoto et al., Journal of the Electrochemical Society, vol. 151, No. 8, pp. A1181-A1187, 2004.

Article—*Electrochemical Characterization of Hydrous Ruthenium Oxide Thin-Film Electrodes for Electrochemical Capacitor Applications*, Kim et al., Journal of the Electrochemical Society, vol. 153, No. 2, pp. A383-A389, 2006.

Article—*Electrochemically Deposited Nanograin Ruthenium Oxide as a Pseudocapacitive Electrode*, Gujar et al., Int. J. Electrochem. Sci., vol. 2, pp. 666-673, 2007.

Article—*Ruthenium dioxide, a fascinating material for atomic scale surface chemistry*, H. Over, Appl. Phys. A 75, pp. 37-44, 2002.

Article—*Sauerstoffverbindungen des Aluminums*, 2. Das Aluminium, pp. 1077-1085.

Article—*Template Synthesis of Nano-structured Ruthenium Oxide Electrode for Supercapacitor Application*, Kim et al., 1 page.

Seminar—9$^{th}$ Int'l Seminar on Double Layer Capacitors and Similar Energy Storage Devices (1999), Evans, et al., *Improved Capacitor Using Amorphous $RuO_2$*, Evans Capacitor Company, Deerfield Beach, FL.

Search Report for GB0913583.1 dated Mar. 16, 2010, 3 pages.

* cited by examiner

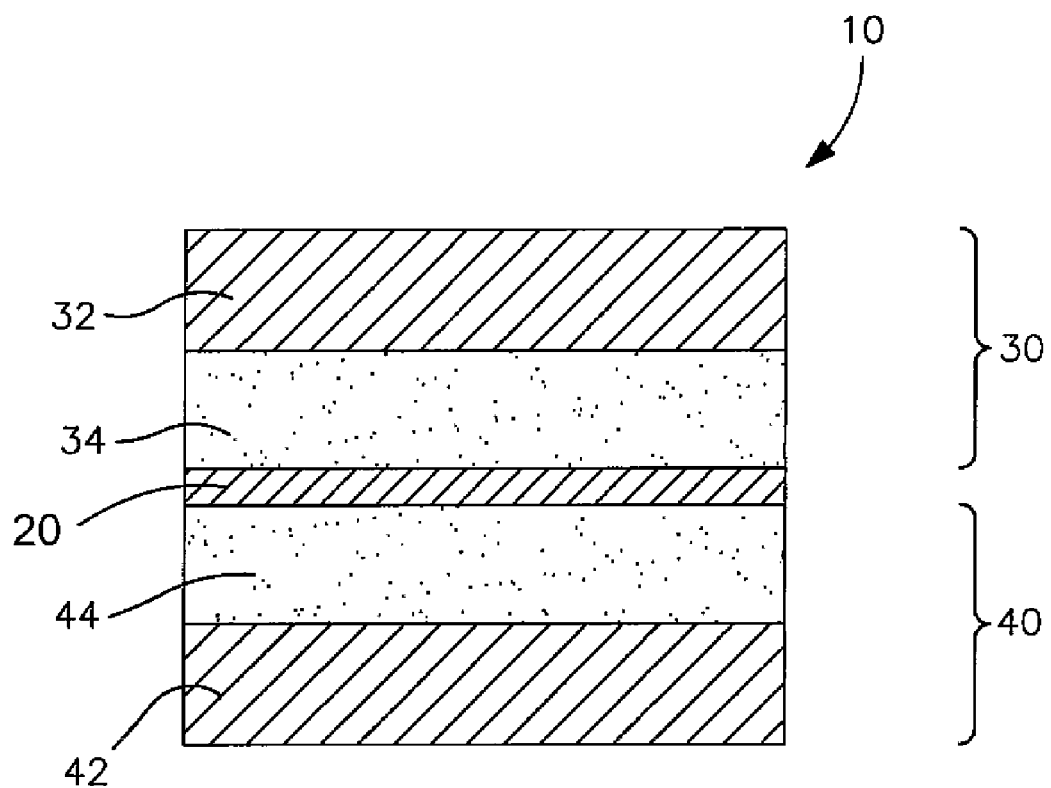

ELECTROCHEMICAL CAPACITOR CONTAINING RUTHENIUM OXIDE ELECTRODES

BACKGROUND OF THE INVENTION

Electrochemical capacitors are devices that store electrical energy at the interface between an ionically-conducting electrolyte phase and an electronically-conducting electrode material. In recent years, ruthenium oxide ($RuO_2$) has been found to be an excellent material for high energy density electrodes because of its high capacitance and low resistance. The excellent capacitance of ruthenium oxide is believed to stem from the ability of ruthenium to readily convert from one oxidation state to another and to proton mobility between the oxide and hydroxyl sites in hydrated ruthenium oxide. More specifically, the pseudocapacitance that arises at the $RuO_2$ and the electrolyte interface is believed to be a result of the facile ionic species absorption on the surface of the $RuO_2$ electrode material. One problem often encountered with such capacitors, however, is the limitation on the maximum amount of capacitance that may be attained. For instance, based on the assumption that one hydrogen ion may be adsorbed on each exposed O atom, it has been estimated that a charge density of 200 $mC/cm^2$ and maximum observed specific capacitance 380 F/g may be achieved (See U.S. Pat. No. 5,875,092 to Jow, et al.). Nevertheless, a need exists for electrochemical capacitors capable of achieving even higher capacitance values.

SUMMARY OF THE INVENTION

In accordance with one embodiment of the present invention, an electrochemical capacitor is disclosed that comprises an electrochemical cell. The cell comprises first and second electrodes and an aqueous electrolyte disposed between the electrodes that includes a polyprotic acid. Each of the electrodes comprises a substrate coated with a metal oxide film. The metal oxide film includes ruthenium oxide and inorganic oxide particles.

In accordance with another embodiment of the present invention, an electrically conductive electrode is disclosed that comprises a metal substrate coated with a metal oxide film, wherein the metal oxide film includes ruthenium oxide and particles containing alumina. In accordance with still another embodiment of the present invention, a method for forming an electrode of an electrochemical capacitor is disclosed. The method comprises coating a metal substrate with a precursor solution, wherein the precursor solution contains a ruthenium oxide precursor and particles containing alumina. The coating substrate is annealed to oxidize the ruthenium oxide precursor.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which:

FIG. 1 is a cross-sectional view of one embodiment of a capacitor formed according to the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed a capacitor containing an electrochemical cell that includes ruthenium oxide electrodes and an aqueous electrolyte containing a polyprotic acid (e.g., sulfuric acid). More specifically, the electrodes each contain a substrate that is coated with a metal oxide film formed from a combination of ruthenium oxide and inorganic oxide particles (e.g., alumina, silica, etc.). Without intending to be limited by theory, it is believed that the inorganic oxide particles may enhance proton transfer (e.g., proton generation) in the aqueous electrolyte to form hydrated inorganic oxide complexes (e.g., $[Al(H_2O)_6^{3+}]$ to $[Al_2(H_2O)_8(OH_2)]^{4+}$). The inorganic oxide thus acts as a catalyst to both absorb and reversibly cleave water into protons and molecular bonded hydroxyl bridges. Because the anions (e.g., sulfate and bisulfate ions) in the electrolyte are not bound in the coordination sphere of the formed aqua complexes, they do not impede the condensation of these complexes required to achieve the additional capacitance over the potential range. As a result, the ionic charges are kept separate and the chemical process may generate pseudo-capacitance. This, in turn, may result in an increase in the charge density and capacitance of the electrode.

The substrate may include any of a variety of different electrically conductive materials, such as such as tantalum, niobium, aluminum, nickel, hafnium, titanium, copper, silver, steel (e.g., stainless), alloys thereof (e.g., electrically conductive oxides), and so forth. Titanium metals, as well as alloys thereof, are particularly suitable for use in the present invention. The geometric configuration of the substrate may generally vary as is well known to those skilled in the art, such as in the form of a container, can, foil, sheet, screen, etc. The surface area of the substrate may range from about 0.05 to about 5 square centimeters, in some embodiments from about 0.1 to about 3 square centimeters, and in some embodiments, from about 0.5 to about 2 square centimeters.

The ruthenium oxide used in the metal oxide film may have any of a variety of forms as is known in the art. For example, the ruthenium oxide may have an amorphous or crystalline morphology, and may be anhydrous or hydrous in nature. In one particular embodiment, for example, the ruthenium oxide is crystalline in nature. To increase the ability of the faradaic reaction to occur through the bulk of the electrode, it is nevertheless often desired that the ruthenium oxide in the metal oxide film is in a hydrous form (i.e., $RuO_2.xH_2O$, where x is greater than 0, such as 1, 2, or 3). Various deposition techniques may be employed to apply ruthenium oxide to the substrate. Suitable techniques include, for instance, reactive sputtering, metallo-organic chemical vapor deposition (MOCVD), pulsed laser deposition, low-temperature chemical vapor deposition, physical vapor deposition (PVD), electrochemical plating, painting, sol-gel deposition, etc. Other suitable techniques are described in U.S. Pat. No. 5,358,889 to Emesh, et al.; U.S. Pat. No. 5,600,535 to Jow, et al.; U.S. Pat. No. 5,875,092 to Jow, et al.; U.S. Pat. No. 5,963,417 to Anderson, et al.; U.S. Pat. No. 6,025,020 to Chen, et al.; U.S. Pat. No. 6,133,159 to Vaartstra, et al.; U.S. Pat. No. 6,383,363 to Jow, et al., as well as U.S. Patent Application Publication Nos. 2003/0107852 to Chen and 2007/0271751 to Weidman, all of which are incorporated herein in their entirety by reference thereto for all purposes.

Regardless of the particular deposition technique chosen, it is often desired to use a ruthenium oxide precursor that is oxidized or otherwise decomposed to form the desired ruthenium oxide. The precursor may include, for instance, a ruthenium(III)salt, such as ruthenium(III)chloride ($RuCl_3$) or ruthenium(III)nitrosyl nitrate, that may be subsequently heat treated to form the $RuO_2$ structure. Another suitable ruthenium precursor is ruthenium tetraoxide, such as described in U.S. Patent Application Publication No. 2007/0271751 to Weidman, which is incorporated herein in its entirety by reference thereto for all purposes. In one particular embodiment, a ruthenium(III)salt is employed that may be oxidized to form a ruthenium(IV)oxide. The precursor may be present in a solution that contains a solvent (e.g., water) and acidic compound to control the pH of the solution within a range of from about 0.5 to about 5.0, and in some embodiments, from about 0.7 to about 2.5. The acidic compound may also help promote the growth of a native oxide on the substrate (e.g., oxide of titanium) that helps protect it from any corrosive compounds employed in the aqueous electrolyte (e.g., sulfuric acid). Examples of suitable acidic compounds for this purpose may include, for instance, nitric acid, nitrous acid, etc.

The substrate may be applied with the precursor solution using various techniques, such as dipping, spraying, coating, etc. Once applied, the coating may optionally be heated to remove the solvent, such as at a temperature of from about 60° C. to about 130° C., and in some embodiments, from about 80° C. to about 110° C. The temperature at which the coating is annealed is generally controlled to achieve the thermal oxidation and the desired morphology of the film. For example, annealing may occur at a temperature of from about 200° C. to about 500° C., in some embodiments from about 250° C. to about 400° C., and in some embodiments, from about 300° C. to about 350° C. The annealing time may range from about 1 to about 60 minutes, and in some embodiments, from about 5 to about 50 minutes. At these conditions, it is believed that the precursor oxidizes to form $RuO_2$, yet retains a hydrous nature, which may be verified by thermogravimetric analysis as is known in the art.

The inorganic oxide particles may be incorporated into the metal oxide film before, during, and/or after deposition of the ruthenium oxide. In one particular embodiment, the inorganic oxide particles are incorporated into the precursor solution prior to annealing the precursor. If desired, the molar ratio of the ruthenium oxide precursor to the inorganic oxide particles may be selected to control the electrical properties of the resulting electrode. That is, if the molar content of the inorganic oxide particles is too great, the electrode may not achieve the desired electrical conductivity. On the other hand, if the molar content of the inorganic particles is too small, the desired capacitance increase may not be achieved. Thus, in most embodiments of the present invention, the molar ratio of the ruthenium oxide precursor to the inorganic oxide particles ranges from about 1:1 to about 60:1, in some embodiments from about 1.5:1 to about 20:1, and in some embodiments, from about 2:1 to about 10:1. The specific amount of the inorganic oxide particles in the precursor solution may range from about 0.05 wt. % to about 10 wt. %, in some embodiments from about 0.1 wt. % to about 5 wt. %, and in some embodiments, from about 0.5 wt. % to about 1.5 wt. %. Likewise, the amount of the ruthenium precursor in the solution may range from about 0.5 wt. % to about 10 wt. %, in some embodiments from about 1.5 wt. % to about 8 wt. %, and in some embodiments, from about 3 wt. % to about 7 wt. %.

Any of a variety of inorganic oxide particles may generally be employed in the present invention. Examples of such particles may include, for instance, silica, alumina, zirconia, magnesium oxide, iron oxide, copper oxide, zeolites, clays (e.g., smectite clay), etc., as well as composites (e.g., alumina-coated silica particles) and mixtures thereof. Alumina is particularly suitable for use in the present invention due to the relatively high number of oxygen atoms within the molecule available for absorption of a dissociated proton from the aqueous electrolyte. Without intending to be limited by theory, it is believed that the alumina particles in the aqueous electrolyte (e.g., $Al_2O_3 * nH_2O$, where n is greater than 0, such as 1, 2, or 3) may undergo condensation to form hydrated complexes (e.g., $[Al(H_2O)_6^{3+}]$ to $[Al_2(H_2O)_8(OH_2)]^{4+}$). Thus, the alumina acts as a catalyst for absorbing and cleaving water into protons and molecular bonded hydroxyl bridges that can be reversibly returned to $Al_2O_3 * nH_2O$. Because the anions in the electrolyte (e.g., sulfate ions) are not bound in the coordination sphere of the formed aqua complexes, they do not interfere with the chemical solution process that generates pseudo-capacitance.

Although the inorganic oxide particles are generally crystalline in nature, the size and surface area of the particles may generally be controlled to maintain the high surface area of the metal oxide film. The particles may, for example, have an average particle size (e.g., diameter or width) of from about 1 nanometer to about 5 micrometers, in some embodiments from 5 nanometers to about 1 micrometer, and in some embodiments, from about 10 nanometers to about 500 nanometers. Likewise, the particles may possess a specific surface area of from about 50 square meters per gram ($m^2/g$) to about 750 $m^2/g$, in some embodiments from about 75 $m^2/g$ to about 500 $m^2/g$, and in some embodiments, from about 100 $m^2/g$ to about 300 $m^2/g$. Surface area may be determined by the physical gas adsorption (B.E.T.) method of Bruanauer, Emmet, and Teller, Journal of American Chemical Society, Vol. 60, 1938, p. 309, with nitrogen as the adsorption gas.

The aqueous electrolyte is the electrically active material that provides the connecting path between the electrodes, and is generally in the form of a liquid, such as a solution (e.g., aqueous or non-aqueous), dispersion, gel, etc. The electrolyte may have an electrical conductivity of about 10 or more milliSiemens per centimeter ("mS/cm"), in some embodiments about 30 mS/cm or more, and in some embodiments, from about 40 mS/cm to about 100 mS/cm, determined at a temperature of 25° C. The value of electric conductivity may obtained by using any known electric conductivity meter (e.g., Oakton Con Series 11) at a temperature of 25° C.

An aqueous solvent (e.g., deionized water) is generally employed in the electrolyte. The solvent may constitute from about 30 wt. % to about 90 wt. %, in some embodiments from about 40 wt. % to about 80 wt. %, and in some embodiments, from about 45 wt. % to about 70 wt. % of the electrolyte. As indicated above, the aqueous electrolyte also includes a polyprotic acid that is capable of undergoing two or more proton dissociations (e.g., two, three, etc.). In this manner, additional protons may be inserted into the ruthenium oxide structure to enhance its charge density. Some examples of suitable polyprotic acids that may be employed include, for instance, hydrogen sulfide (diprotic), sulfuric acid (diprotic), sulfurous acid (diprotic), phosophoric acid (triprotic), oxalic acid (diprotic), carbonic acid (diprotic), malonic acid (diprotic), etc. Sulfuric acid ($H_2SO_4$) may, for instance, donate one proton to form a bisulfate anion ($HSO_4^-$) and a second proton to form a sulfate anion ($SO_4^{2-}$). Without intending to be limited by theory, it is believed that the oxygen atoms of the inorganic particles facilitate the release and adsorption of this second proton, which further enhances the charge density of the resulting metal oxide film. In addition to polyprotic acids, the electrolyte may also contain monoprotic acidic compounds, such as nitric acid, nitrous acid, hydrochloric acid, perchloric acid, hydroiodic acid, hydrofluoric acid, etc. In certain cases, such monoprotic acidic compounds may stem from those originally included within the precursor solution (e.g., nitric acid) during formation of the oxide film.

In addition to the components noted above, a non-conductive, permeable separator may also be employed in the capacitor that inhibits shorting of the charge collected on either the electrode substrates. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes.

The physical arrangement of the electrodes and aqueous electrolyte of the capacitor may generally vary as is well known in the art. Referring to FIG. 1, for example, one embodiment of an electrochemical capacitor 10 is shown that includes an electrolyte 20 (not shown) in communication with a first electrode 30 and a second electrode 40. The first electrode 30 includes a substrate 32 (e.g., titanium) coated with a metal oxide film 34. Likewise, the second electrode 40 includes a substrate 42 (e.g., titanium) coated with a metal oxide film 44. Both films 34 and 44 are formed from a combination of ruthenium oxide and inorganic oxide particles as described above. A separator 50 may be positioned between the electrodes to prevent direct contact between the electrodes, yet permit ionic current flow of electrolyte 20. Typically, the electrodes are separated by a distance of from about 10 micrometers to about 1000 micrometers. The embodiment shown in FIG. 1 includes a single electrochemical cell. It should be understood, however, that the capacitor of the present invention may include two or more cells. In one such embodiment, for example, the capacitor may include a stack of individual electrochemical cells as is well known in the art. The cells may be the same or different. In a particular embodiment, for example, the cells are constructed in a similar manner and each contain an aqueous electrolyte and ruthenium oxide electrodes, such as described above.

Regardless of its particular configuration, the electrochemical capacitor of the present invention may possess a relatively high capacitance that enables its use in a wide variety of applications. For example, the capacitance of each electrode of a cell (½ cell) may be about 350 milliFarads per square centimeter ("$mF/cm^2$") or more, in some embodiments from about 450 to about 1500 $mF/cm^2$ or more, and in some embodiments, from about 500 to about 1000 $mF/cm^2$, as determined by cyclic voltammetry in a 0.5 M $H_2SO_4$ solution against a $Hg/HgSO_4$ reference electrode at a scan voltage of −0.5 V to 0.5V and scan rate of 25 mV/s. Such high capacitance electrodes are well suited for use in a wide variety of applications, such as in medical devices (e.g., implantable defibrillators, pacemakers, cardioverters, neural stimulators, drug administering devices, etc.); automotive applications; military applications (e.g., s RADAR systems); consumer electronics (e.g., radios, televisions, etc.); and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 800 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank.

The present invention may be better understood by reference to the following examples.

EXAMPLE 1

A titanium sheet (surface area of 1.92 $cm^2$) was cleaned in oxalic acid (10 wt. % solution) for 65 minutes at 90° C. then rinsed with deionized water and allowed to dry. A ruthenium (III)nitrosyl nitrate solution in dilute nitric acid was obtained from Aldrich (#373567). 50 milliliters of the solution was measured into a 100 mL beaker and heated until the remaining volume approached 20 milliliters. After cooling, the actual remaining volume was 21.6 milliliters. This precursor contained 3.2-3.6 wt. % ruthenium and had a pH of 0.9±0.1. The substrate was heated on a hot plate to 80° C.-120° C. and 21 microliters of the dehydrated solution was pipetted onto the substrate. Upon drying, the substrate was placed in an oven for thermal oxidation at 320° C. (1 hour ramp time to 320° C. and then 45 minutes at 320° C. in a nitrogen atmosphere). The substrate was then placed in a hot deionized water bath for 35 minutes at 95° C. to remove any unoxidized precursor. Two (2) microliters of 2M sulfuric acid was added directly to the $RuO_2$ after the water bath at a temperature of approximately 100° C. for 10 to 20 minutes. After drying, the coating steps were repeated two more times. The capacitance of the resulting electrode was measured by cyclic voltammetry in 0.5M sulfuric acid and a $Hg/HgSO_4$ reference electrode in saturated potassium sulfate solution (scan relative to reference electrode was −0.5V to 0.5V, scan rate was 25 mV/s). The capacitance value was determined to be 0.466 F per half cell.

EXAMPLE 2

An electrode was formed as described in Example 1, except that alumina was added to the precursor solution at a molarity of 0.0065M. The capacitance value of the electrode was determined to be 0.541 F per half cell.

EXAMPLE 3

An electrode was formed as described in Example 1, except that alumina was added to the precursor solution at a molarity of 0.047M. The capacitance value of the electrode was determined to be 0.564 F per half cell.

EXAMPLE 4

An electrode was formed as described in Example 1, except that alumina was added to the precursor solution at a molarity of 0.10M. The capacitance value of the electrode was determined to be 0.685 F per half cell.

EXAMPLE 5

An electrode was formed as described in Example 1, except that alumina was added to the precursor solution at a molarity of 0.15M. The capacitance value of the electrode was determined to be 0.813 F per half cell.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrochemical capacitor comprising an electrochemical cell, the cell comprising:
   first and second electrodes, each of the electrodes comprising a metal substrate coated with a metal oxide film, wherein the metal oxide film includes ruthenium oxide and inorganic oxide particles; and
   an aqueous electrolyte in communication with the first and second electrodes, wherein the electrolyte includes a polyprotic acid.

2. The electrochemical capacitor of claim 1, wherein the metal substrate comprises titanium.

3. The electrochemical capacitor of claim 1, wherein the ruthenium oxide is hydrated.

4. The electrochemical capacitor of claim 1, wherein the molar ratio of the ruthenium oxide to the inorganic oxide particles is from about 1:1 to about 60:1.

5. The electrochemical capacitor of claim 1, wherein the molar ratio of the ruthenium oxide to the inorganic oxide particles is from about 2:1 to about 10:1.

6. The electrochemical capacitor of claim 1, wherein the inorganic oxide particles include silica, alumina, zirconia, magnesium oxide, iron oxide, copper oxide, zeolites, clays, composites thereof, or mixtures thereof.

7. The electrochemical capacitor of claim 1, wherein the inorganic oxide particles include alumina.

8. The electrochemical capacitor of claim 1, wherein the inorganic oxide particles have an average size of from about 1 nanometer to about 5 micrometers.

9. The electrochemical capacitor of claim 1, wherein the inorganic oxide particles have an average size of from about 10 nanometers to about 500 nanometers.

10. The electrochemical capacitor of claim 1, wherein the polyprotic acid includes sulfuric acid.

11. The electrochemical capacitor of claim 10, wherein the aqueous electrolyte further includes nitric acid.

12. The electrochemical capacitor of claim 1, wherein the cell further comprises a permeable separator.

13. The electrochemical capacitor of claim 1, wherein the capacitor includes multiple electrochemical cells.

14. The electrochemical capacitor of claim 1, wherein the electrolyte includes an aqueous solvent in an amount from about 30 wt. % to about 90 wt. % of the electrolyte.

15. The electrochemical capacitor of claim 1, wherein the metal oxide film is formed by coating the metal substrate with a precursor solution, wherein the precursor solution contains a ruthenium oxide precursor and the inorganic oxide particle, and thereafter annealing the coated substrate to oxidize the ruthenium oxide precursor.

16. The electrochemical capacitor of claim 1, wherein the electrodes have a specific capacitance of from 350 milliFarads per square centimeter or more.

17. The electrochemical capacitor of claim 1, wherein the electrodes have a specific capacitance of from 500 to about 1000 milliFarads per square centimeter.

* * * * *